US006928639B2

(12) United States Patent
Juan et al.

(10) Patent No.: US 6,928,639 B2
(45) Date of Patent: Aug. 9, 2005

(54) TIME-INTERVAL BASED MONITOR FUNCTION FOR DYNAMIC INSERTION INTO AND REMOVAL FROM A RUNNING APPLICATION

(75) Inventors: Ya-Huey Juan, Poughkeepsie, NY (US); Jhy-Chun Wang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 09/950,918

(22) Filed: Sep. 11, 2001

(65) Prior Publication Data

US 2004/0205723 A1 Oct. 14, 2004

(51) Int. Cl.[7] .................................................. G06F 9/44
(52) U.S. Cl. ........................ 717/127; 717/128; 717/129
(58) Field of Search ................................ 717/127–132, 717/145, 146, 155

(56) References Cited

U.S. PATENT DOCUMENTS

| | | | |
|---|---|---|---|
| 5,442,785 A | 8/1995 | Roffe et al. ..................... 707/8 |
| 5,450,545 A | 9/1995 | Martin et al. ................... 717/1 |
| 5,794,047 A | 8/1998 | Meier ............................. 714/4 |
| 5,802,371 A | 9/1998 | Meier ............................. 714/4 |
| 5,852,449 A | 12/1998 | Esslinger et al. ........... 345/473 |
| 5,970,248 A | 10/1999 | Meier ............................. 717/4 |
| 6,079,032 A * | 6/2000 | Peri ............................. 714/38 |
| 6,126,330 A | 10/2000 | Knight ........................... 717/4 |
| 6,161,219 A * | 12/2000 | Ramkumar et al. ......... 717/130 |
| 6,219,782 B1 * | 4/2001 | Khan et al. ................... 712/227 |
| 6,266,805 B1 * | 7/2001 | Nwana et al. ............... 717/104 |
| 6,324,683 B1 * | 11/2001 | Fuh et al. ..................... 717/124 |
| 6,343,378 B1 * | 1/2002 | Moroda ....................... 717/162 |
| 6,513,155 B1 * | 1/2003 | Alexander et al. ........... 717/124 |
| 6,553,564 B1 * | 4/2003 | Alexander et al. ........... 717/128 |
| 6,698,013 B1 * | 2/2004 | Bertero et al. ............... 717/127 |
| 6,714,976 B1 * | 3/2004 | Wilson et al. ............... 709/224 |
| 6,728,949 B1 * | 4/2004 | Bryant et al. ................ 717/127 |
| 6,742,143 B2 * | 5/2004 | Kaler et al. .................... 714/39 |
| 6,854,108 B1 * | 2/2005 | Choi ........................... 717/125 |

OTHER PUBLICATIONS

Peters et al, Requirments based moniors for real time system, ACM ISSTA, pp 77–85, 2000.*

Griswold, "Core algorithms for autonomous monitoring of distributed systems", ACM pp 36–45, 1991.*

Wybranietz et al, Monitoring and performance measuring distributed systems during operation, ACM pp 197–206, 1988.*

"Performance Tuning with AIMS—an Automated Instrumentation and Monitoring System for Multicomputers", Yan, J.C., Hawaii International Conference on System Sciences, 27th, Wailea, Jan. 4–7, 1994, Proceedings, vol. 2, pp. 625–633.

"Trapper: a Graphical Programming Enviornment for Industrial High–performance Applications", Scheidler, C. et al., International Parle Conference 5th, Munich, Jun. 14–17, 1993, Proceedings of Parle '93: Parallel Architectures and Languages Europe, pp. 403–413.

(Continued)

Primary Examiner—Anil Khatri
(74) Attorney, Agent, or Firm—Lawrence D. Cutter, Esq.; Kevin P. Radigan, Esq.; Heslin Rothenberg Farley & Mesiti, P.C.

(57) ABSTRACT

A time-interval based monitor tool is provided for monitoring performance of a running application. The tool includes a time-based monitor function which is dynamically insertable into and removable from an address space of a running application to be monitored transparent to the application and without requiring recompilation. The time-based monitor function allows an operator to reset the monitor time interval without requiring extraction of the monitor function. In addition, the time-based monitor function allows access to one or more global variables of the application, and by changing a global variable can effect a change in the application's operation path.

41 Claims, 6 Drawing Sheets

OTHER PUBLICATIONS

"TAE Plus: Transportable Applications Enviornment Plus: a User Interface Development Environment", Szczur, M.R. et al., ACM Transactions on Information Systems, vol. 11, issue 1, Jan. 1993, pp. 76–101.

"Object–oriented Graphical Languages and Environment for Real–time Fault Diagnosis", Stanley, G.M. et al., Computer–oriented Process Engineering, Proceedings of COPE–91, European Symposium of WOrking Part on the Use of Computers in Chemical Engineering, 22nd, Barcelona, Oct. 14–16, 1991, pp. 265–270.

"Monitoring and Performance Measuring Distributed Systems During Operation", Wybranietz, D. et al., Performance Evaluation Review, vol. 16, issue 1, May 1988: ACM Sigmetrics Conference on Measurement and Modeling of Computer Systems, Santa Fe, May 24–27, 1988, Proceedings, pp. 197–206.

"Computer–aided Chemistry, pt. 2: a Spectral Database Management Program for Use with Microcomputers", Browett, W.R. et al., Computers and Chemistry, vol. 11, issue 1, 1987, pp. 73–82.

IBM Manual, "DPCL Class Reference", Version 3, Release 1, Publication No. SA22–7421–00, pp. 139, 261, 351, 363, 369.

* cited by examiner fig. 1 fig. 2 fig. 3 fig. 4 fig. 5 fig. 6A fig. 6B

TIME-INTERVAL BASED MONITOR FUNCTION FOR DYNAMIC INSERTION INTO AND REMOVAL FROM A RUNNING APPLICATION

FIELD OF THE INVENTION

The present invention relates in general to the field of software monitoring, and more particularly, to time-interval based methods and systems for dynamically monitoring a running application program and/or multiple running application programs within a computer environment.

BACKGROUND OF THE INVENTION

Users of computing applications often encounter various sorts of problems and inconsistencies while using the applications. Designing computer software that will minimize user problems requires knowledge as to how the user is making use of the application and the tasks that are trying to be accomplished by use of the applications. The design process typically includes iterative design and user testing of those designs in order to identify where users have problems so that design flaws can be accurately addressed and fixed. A thorough knowledge of problems that users encounter in existing products is also critical if design mistakes are to be avoided for future versions of those applications.

Understanding what is important to users of a particular software application product is a challenge for software application developers. Typically, enhancements to a product release are based on feedback from surveys, forums or from user design center sessions in which participants are given a set of tasks to accomplish while using the application. Some problems inherent in these methods, however, include the inability of users to articulate their needs, the artificiality of surveys produces feedback which is not meaningful, and users of forums are typically technical fans of the product so that the results may be of little practical use to the product developers.

Most would agree that the best way to get feedback is by observing what a user does throughout actual use sessions with the product, that is by watching the user as the user works through the application in the setting for which it was intended. The problem is to provide a meaningful solution for gathering real user feedback in real time on a regular basis, and providing this data back to the program developer where it can be analyzed and used in enhancing and improving the application. One effective way of gathering such information about user interaction with the application is through code instrumentation. The term "instrumentation" is understood to mean the incorporation of statements or routines in an application to cause outputs to be provided when the application is running on a computer system thereby illustrating the interaction of the end user with the application.

Currently, it is known that instrumenting an application involves going into the application and adding appropriate program code at every point in the application where useful user data can be gathered, and then recompiling the application. It has been found that this "compile-time" method of instrumentation is not really effective for a number of reasons. It takes many points of instrumentation to get sufficient and meaningful overall coverage of user interaction with the application. At the particular code level, it is difficult to be judicious in selecting code points for instrumentation. A large number of instrumentation points can negatively affect the application's performance. The amount of data produced depends entirely on where the user is spending time in working with the application. In some instances, the data can be large and therefore cumbersome to analyze, and at other times, it may be sparse and therefore of very little practical use.

In view of the above, a need exists in the art for enhanced run-time instrumentation techniques for instrumenting one or more program applications to eliminate the aforementioned difficulties inherent with known compile-time methods of instrumentation.

DISCLOSURE OF THE INVENTION

Briefly summarized, provided herein in one aspect is a computer application monitoring method which includes: providing a time-based monitor function; and inserting the time-based monitor function into an application to be monitored. In an enhanced aspect, the inserting comprises dynamically inserting the monitor function into the application, wherein the monitoring approach comprises a run-time, time-interval based technique which is transparent to the running application. The application may comprise only one running application of a plurality of running applications in a computer environment.

Systems and computer program products corresponding to the above-summarized methods are also described and claimed herein.

The proposed monitoring tool presented herein provides several advantages over prior instrumentation approaches. For example, the time-interval based monitor function of this invention is designed to monitor an individual application running in a multi-application environment, but can also be used to monitor multiple applications on a system-wide basis if desired. Further, the monitor function can be dynamically inserted into a running application, and dynamically removed from a running application. The monitor function is a time-interval based monitoring tool, and the time interval can be modified while the monitored application is running. The monitoring tool provides a default monitor function, but also allows a user the flexibility of defining a custom monitor function for dynamic insertion into a running application. By providing a platform in the tool for a user to specify a customized monitor function, a user is not limited to the default monitor function provided by the tool. Users are free to define specific functions to meet their requirements, which enhances a user's capacity in monitoring a particular application's run-time behavior. The monitor tool presented herein is a unique tool for use in monitoring an application's run-time behavior.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE OF CARRYING OUT THE INVENTION

In accordance with certain aspects of the present invention, an application monitoring tool is presented herein which allows a user to dynamically insert a monitor function into a running application. The monitor function is a time-interval based monitor function which is invoked when a preset monitor interval expires. When the monitor function executes, it can send a message back to the tool, and the monitor tool will then display a message on a display panel for a user. Advantageously, the time-interval can be modified while the monitor function resides within the monitored application. In addition to providing a default monitor function, a user is allowed to define a customized monitor function which can be selected for placement into the running application in place of a default monitor function provided by the tool.

There are many reasons to monitor a running application. To name a few: (1) to understand the application's run-time behavior; (2) to ensure that the application achieves an expected performance; and (3) to monitor the application's system resource usage, e.g., memory usage. The monitoring operation can be further divided into two categories: (1) location-based monitoring, where a monitor function is placed in a specified location application, and the function is triggered when the monitored application's execution reaches that location; or (2) time interval-based monitoring, where a monitor function is triggered at a preset time interval, regardless of where the application execution is at that moment. There are many tools that support location-based monitoring. In contrast, presented herein, is a time interval-based monitoring tool, which can be employed to focus on an individual application principally, but secondarily can be employed on a system-wide basis.

In one embodiment, a tool as proposed herein has the following features: (1) it monitors individual applications, but can also be used to monitor system-wide status; (2) the tool can be dynamically inserted into a running application, and dynamically removed from a running application; (3) the tool is a time interval-based monitoring function, and the time interval can be changed while the monitored application is running; and (4) the tool provides a default monitor function, but can also allow a user the freedom to define a custom monitor function.

Figure 1:
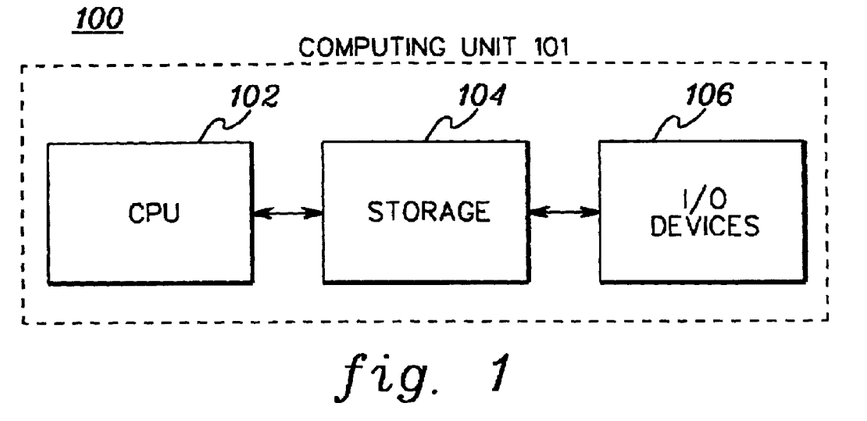
FIG. 1 depicts one example of a computing environment to employ a time-interval based monitor function in accordance with one aspect of the present invention.

One example of a computing environment incorporating and using a monitor function facility in accordance with the present invention is depicted in FIG. 1 and described below.

Referring to FIG. 1, a computer environment 100 includes, for instance, a computing unit 101 having at least one central processing unit 102, a main storage 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 102 is coupled to main storage 104, which is directly addressable and provides for high speed processing of data by the central processing unit. Main storage may be either physically integrated with the CPU or constructed in stand alone units.

Main storage 104 is also coupled to one or more input/output devices 106. These devices include, for instance, keyboards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

In one example, computer environment 100 is a single system environment, which includes an RS/6000 computer system running an AIX operating system. (RS/6000 and AIX are offered by International Business Machines Corporation, Armonk, N.Y.). The invention is not limited to such an environment, however. The capabilities of the present invention can be incorporated and used within many types of computer environments and many types of computer systems. For instance, computer environment 100 can include a UNIX workstation running a UNIX-based operating system. Other variations are also possible and are considered a part of the claimed invention.

A monitor tool or facility in accordance with the present invention includes three functions; i.e., an ability to be inserted into a running application; an ability to set/reset the monitor time interval; and an ability to be removed from the running application. Each of these is discussed below.

A time-based monitor function in accordance with an aspect of the present invention can be inserted dynamically into one or more running programs. A user can specify the time interval for the monitoring operation. In one embodiment, the monitor tool supports a granularity of 0.01 seconds. A default monitor function provided by this tool could report the monitored application's status on: CPU usage, memory usage, paging activity, and context switch activity in one embodiment. Thus, every time the default monitor function is invoked, a message containing the above status will be sent back to the tool. The tool can display the message in a desired format, for example, "hostname:PID-:message" in a display panel. The hostname is the machine name where the monitored application is running, while the PID is the application's PID. The tool allows the monitoring of multiple running applications (on multiple machines) simultaneously.

Further, users are allowed to overwrite the default monitor function and replace it with a custom monitor function. The syntax of the monitor function, discussed further below, allows a user to design the custom monitor function in the proper format. The user-defined monitor function will allow users to specify particular monitoring actions they would like to employ. For example, an action can be defined such that a report is generated (and sent back to the monitor tool) only when a threshold value is exceeded or a report is generated only when a special event occurs.

In order for a monitor tool (implementing an embodiment of this invention) to locate a user-defined monitor function in a user-specified loadable module, the monitor function should have a specific name and syntax that is expected by the monitor tool. The monitor tool should publish the naming convention and function syntax so that users who want to define their own monitor function know how to specify it.

As a example, a monitor tool can specify the monitor function to be:

dmonitor(void*)

When a user creates a loadable module with such a function, the monitor tool is able to locate the function in the loadable module and use it as a monitor function. The reason to have a "void*" function parameter is that it can be used to pass in a function pointer. A useful function to be passed in through this parameter is the DPCL Ais_send function. The Ais_send function can be used in a monitor function to send data back to a monitor tool, so that the data can be displayed in the tool's output window. Without the use of Ais_send, a monitor function will have to write its data either to a file or to stdout/stderr, which, in most cases, is not a desirable approach.

A monitor tool is free to define the naming convention and function syntax for the monitor function. Any loadable module with a function that matches the specification will be able to be used by the monitor tool in a performance monitoring operation.

Additionally, it is possible for either the default monitor function or a custom monitor function to gain access to a monitored application's (exported) global variables, which will allow the monitor function to examine values of the global variables. This ability to gain insight into the global variables opens up a capability for application steering, where the values of the global variables can be examined and altered to steer the monitored application into a different execution path. This aspect of the invention is described in detail below with reference to FIGS. 5, 6A & 6B.

In another aspect, a monitor tool in accordance with the present invention allows a user to modify the monitor time interval after the monitor function has been inserted into a running application. Thus, the user can adjust the monitoring frequency during the monitoring process. For example, a user could shorten the time monitoring interval to intensify the monitoring process when a special event occurs, then slow the monitoring interval when the event vanishes.

A third function noted above is that the monitor function can be removed from the monitored, running application when no longer needed, with the application continuing to execute normally. The insertion and removal of the monitor function can be transparent to the application.

One embodiment for implementing the above-noted functions of the present invention is discussed below employing commands from the Dynamic Probe Class Library (DPCL), which is a product offered by International Business Machines Corporation (IBM) and which is described in various IBM publications, including "DPCL Class Reference, IBM Parallel Environment for AIX" Version 3, Release 1, SA22-7421-00 (April 2000) and "Dynamic Probe Class Library Programming Guide, IBM Parallel Environment for AIX", Version 3, Release 1, SA22-7420-00 (April 2000), each of which is hereby incorporated herein by reference in its entirety. A graphical user interface can be readily constructed by one skilled in the art for use in an application performance data gathering tool as described herein. Specifically, the above-incorporated DPCL commands can be used as an underlying structure for manipulating a user application on-the-fly. Example functions include dynamically connecting to a running application, inserting a probe (i.e., a piece of executable code) into a running application, or dynamically disconnecting from a connected application.

Figure 2:
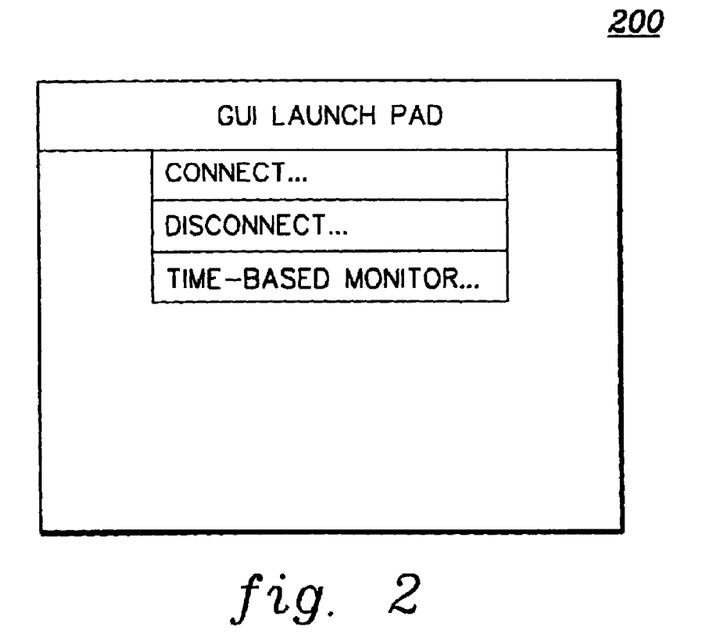
FIG. 2 depicts one embodiment of a user interface for selecting time-based monitoring in accordance with an aspect of the present invention.
Figure 3:
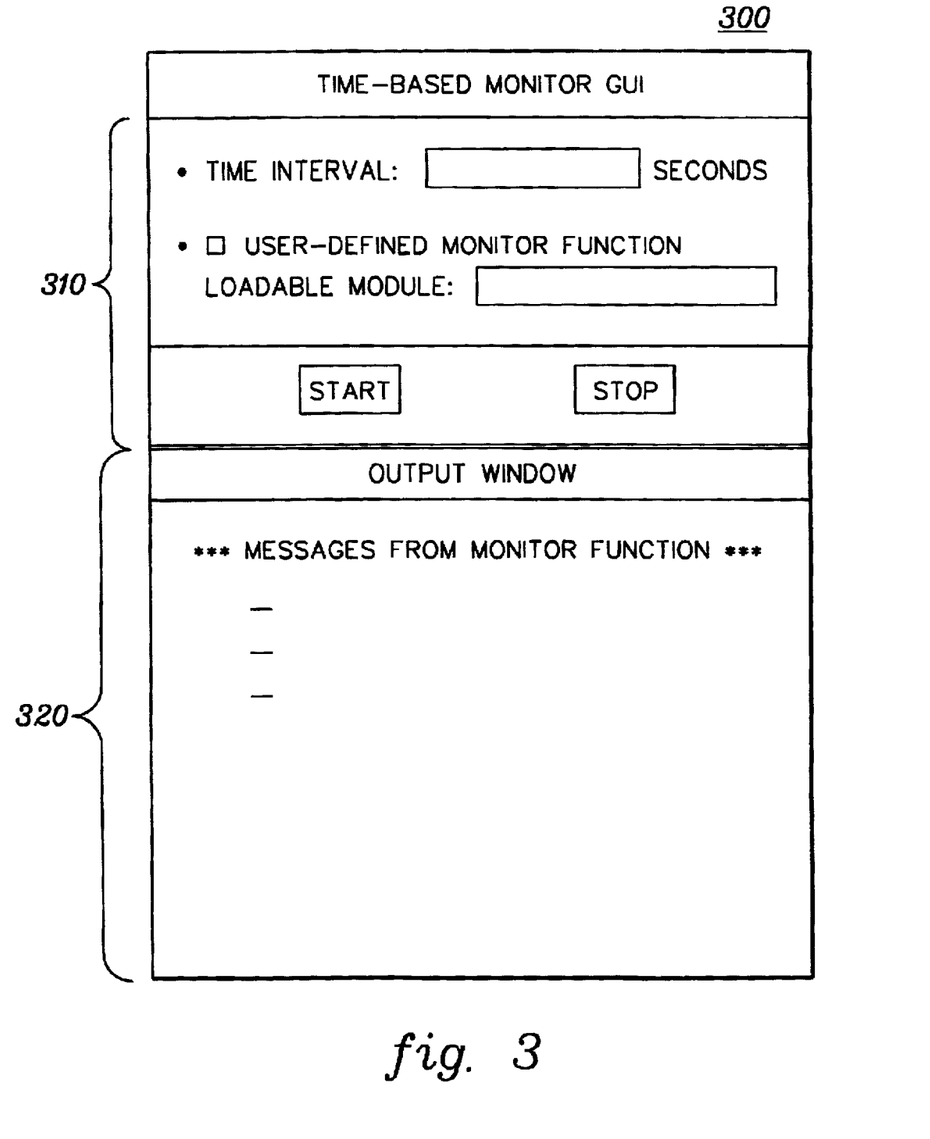
FIG. 3 depicts one example of a graphical user interface for a time-interval based monitor function in accordance with an aspect of the present invention.

FIGS. 2 & 3 provide a high level layout of a time-interval based dynamic application monitor interface in accordance with this invention. FIG. 2 depicts a portion of a first interface wherein the "connect" and "disconnect" menu options are readily constructed from DPCL commands as described further below. The "time-based monitor" menu option is a new function which is added in accordance with an aspect of the present invention. When the "time-based monitor" option is selected, the time-based monitor window 300 of FIG. 3 is brought up. The GUI depicted in FIG. 3 is one embodiment of a new interface in accordance with the present invention. Through this interface, a user can control the operation of the time-based monitor function, e.g., via the options of upper window 310. The lower portion of interface 300 comprises an output window 320, where any data/messages returned by the monitor function are displayed to the user. The upper portion of the interface includes an area for specifying the time monitoring interval, and another area for specifying whether a custom or user-defined monitor function is to be employed rather than a default monitor function.

One procedure for employing the tool of FIGS. 2 & 3 is as follows: (1) use the "connect" option in FIG. 2 to connect to a running application; (2) use the "time-based monitor" option in FIG. 2 to bring up the time-based window (FIG. 3); (3) specify the time interval and whether a user-defined loadable module is to be employed using the time-based monitor window, then use the "start" and "stop" buttons to control the execution of the monitoring process. When "stop" is selected, the monitor function is suspended, and the user can alter the monitoring time interval or load a different user defined monitor function, then select "start" option to resume the monitoring process. Use of the "disconnect" option in FIG. 2 disconnects the monitor function from the application and allows the application to continue with its normal execution.

Figure 4:
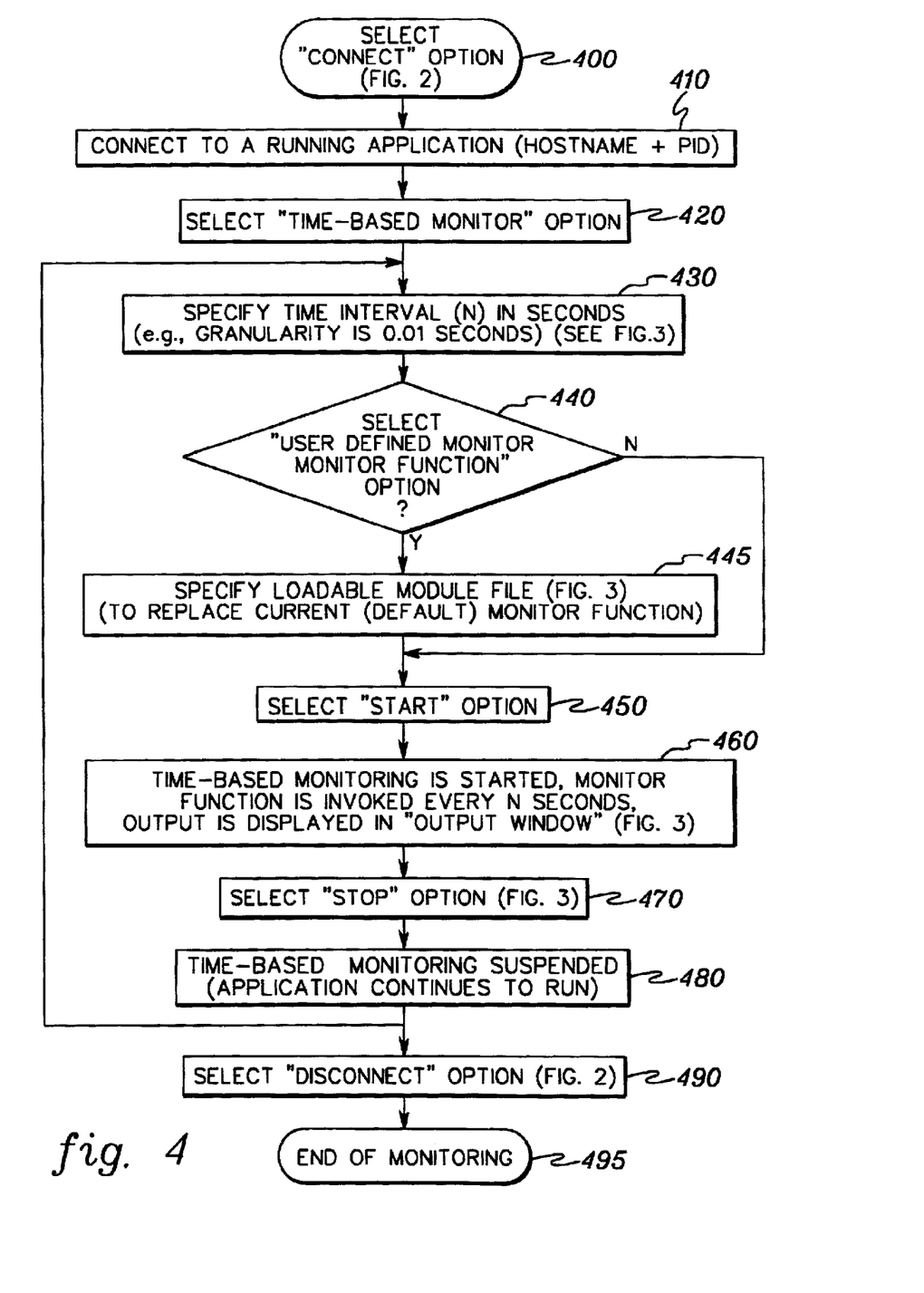
FIG. 4 is a flowchart of one embodiment for dynamically inserting a time-interval based monitor function into an application and dynamically removing the monitor function from the application in accordance with an aspect of the present invention.

FIG. 4 depicts a more detailed flowchart of the monitoring tool process in accordance with one aspect of the present invention. When connecting to a running application, a user first selects the "connect" option shown in FIG. 2 400. A user is asked to specify the machine host name where the application is running and the application's PID. (Note that a running application's process id (i.e., PID) can be obtained by typing the Unix command "ps" on the machine where the application is running. The name of the machine where the application is running can be obtained by typing the Unix command "hostname" on the machine.) This information is used to establish a connection with the target application 410. Once the connection is established, the "time-based monitor" option of FIG. 2 can be selected to bring up the time-based monitor window of FIG. 3. Using the window of FIG. 3, the monitoring time interval is set in seconds 430. In one embodiment, granularity of 0.01 seconds can be provided.

If desired, the "user-defined monitor function" can be selected 440. By way of example, the "loadable module"

field in window 310 (FIG. 3) could be grayed out by default, but activated when the "user-defined monitor function" option is selected by the user. When the field is activated, a user can specify the file name of a loadable module that contains a custom monitor function 445. When confirmed, the user-defined monitor function will replace the default monitor function, or another user-defined monitor function that is currently in place. As one example, a monitor tool could use the user-specified file name to locate the loadable module, then the DPCL ProbeModule class and load_module function to locate the monitor function in the loadable module and load the module into a target application's address space, respectively. Once the module is loaded into a target application, the monitor function in the module will be invoked per the specified time interval.

The user then selects the "start" button 450 to start the monitoring operation. Any output generated by the monitor function is displayed in the output window 320 (FIG. 3). Once started, the time-based monitoring function is invoked every N seconds, with each invocation generating an updated display in the output window 460. The monitoring function is suspended by selecting the "stop" button 470. Notwithstanding suspension of the time-based monitoring function, the application continues to run 480. When the monitoring is suspended, a user can change the monitor time interval and/or the monitor function itself. The user then selects the "start" button to resume the monitoring operation.

When sufficient performance data has been collected, the user selects the "disconnect" option (FIG. 2) to disconnect from the application. The application then continues with its normal execution and the monitoring process is ended 495. This connect-monitor-disconnect procedure can be repeated multiple times during the life cycle of a target application.

From the above discussion, those skilled in the art will note that a monitor tool and function as described herein can embody the following features:

(1) the monitoring approach focuses on an individual application, although the approach can be expanded to monitor system-wide activity.

(2) the monitor approach can dynamically connect to a running application, and dynamically disconnect from a connected application.

(3) the monitoring approach uses a time interval to decide the frequency of collecting the target application's performance data. This is different from other performance tools where data gathering is typically based on location, e.g., function entry point. In those tools, unless the target application's execution reaches a specified data gathering location, no action will take place. In the present tool, the data gathering function will be woke up to collect performance data whenever the preset time interval expires. The timer will then be reset and the process will start all over again. The data gathering does not rely on the application's execution location, when the monitor function is woke up, it will go to work with no regard of where the application is currently running.

(4) the time interval can be changed during the monitoring period. The monitoring can be started with slower frequency (i.e., larger time interval value), then when the target application reaches a certain critical phase, the time interval can be shortened to intensify the performance data gathering. Alternatively, a user could start the monitoring with a high frequency (i.e., short time interval value), then reduce the frequency over time. As a specific example, the DPCL Phase class can be used to construct the time-interval based monitor function. A populated Phase object will contain the time interval and the monitor function currently used. Once a Phase object is created, it can be inserted to a target application by DPCL add_phase function. A Phase object can be removed by DPCL remove_phase function. To change the monitor time interval, DPCL set_phase_period function can be used. Specifying zero (0) interval in the set_phase_period function will effectively suspend the monitoring operation, but keep the monitor function in the target application.

(5) the monitor tool preferably provides a default monitor function, e.g., which may collect the target application's CPU usage, memory usage, etc. A user could replace the function with a custom monitor function. By allowing a user to define a custom monitor function, this gives the user flexibility on what performance data is to be collected, and how it is collected.

(6) when a user defines a custom monitor function, certain function syntax convention discussed below is followed, but aside from that, the user is free to define the execution flow within the function.

(7) the monitor function is loaded into the target application's address space, so it essentially becomes part of the application. (Again, the DPCL ProbeModule class and load_module function can be used to load or replace a monitor function in a target application.) As such, the monitoring function can access the application's global data structures. This feature allows the monitor function to gain great insight of the target application's run-time behavior. If an application is designed to be monitoring-aware, i.e., the application employs global data structures to hold its run-time performance data, a monitor function that is aware of those global data structures can retrieve that data and associate the data with predefined actions in the monitor function, which will provide an active interaction between the application and the monitor function. A monitor function can even modify one or more of these global data structures and alter the target application's execution flow as a result (this is called "application steering").

By way of example, in order for the monitor tool to locate a user-defined monitor function in a specified loadable module file, the monitor tool requests a specific function name so that it can find it in the loadable module's symbol table. For example, the monitor tool can request any user-defined monitor function to be named dmonitor( ) with one parameter "void*", i.e., the function would be dmonitor (void*). The reason to have a void* as a parameter is that, in order to send data/message back to the monitor tool, a user-defined monitor function is to use a DPCL function called Ais_send( ) to do so. Using standard Unix output function like printf( ) would have the monitor function's output being sent to the target application's stdout, which, in most cases, is not a desirable behavior.

As long as the monitor tool publishes a specific function name with at least one function parameter (void*), any loadable module with such a function name and proper syntax can be used in the monitor tool.

The following example assumes that the monitor uses dmonitor(void*) as the monitor function name/syntax, it further assumes the target application has three global variables that contains information regarding the application's run-time performance, and one global variable that contains a value used to decide a certain runtime operation. The loadable module that contains the monitor function dmonitor declares three "extern" variables, each maps to one of the target application's global variables. The monitor function will use DPCL function Ais_send to send the values back to the monitor tool, the monitor function also defines a threshold that when global variable1 (gval_1) exceeds the value, a function (appl_func_1) defined in the target application will be invoked by the monitor function. To implement a monitor tool, one skilled in the art should reference the above-incorporated DPCL documents for the definition and usage of related DPCL classes and functions.

Figure 5:
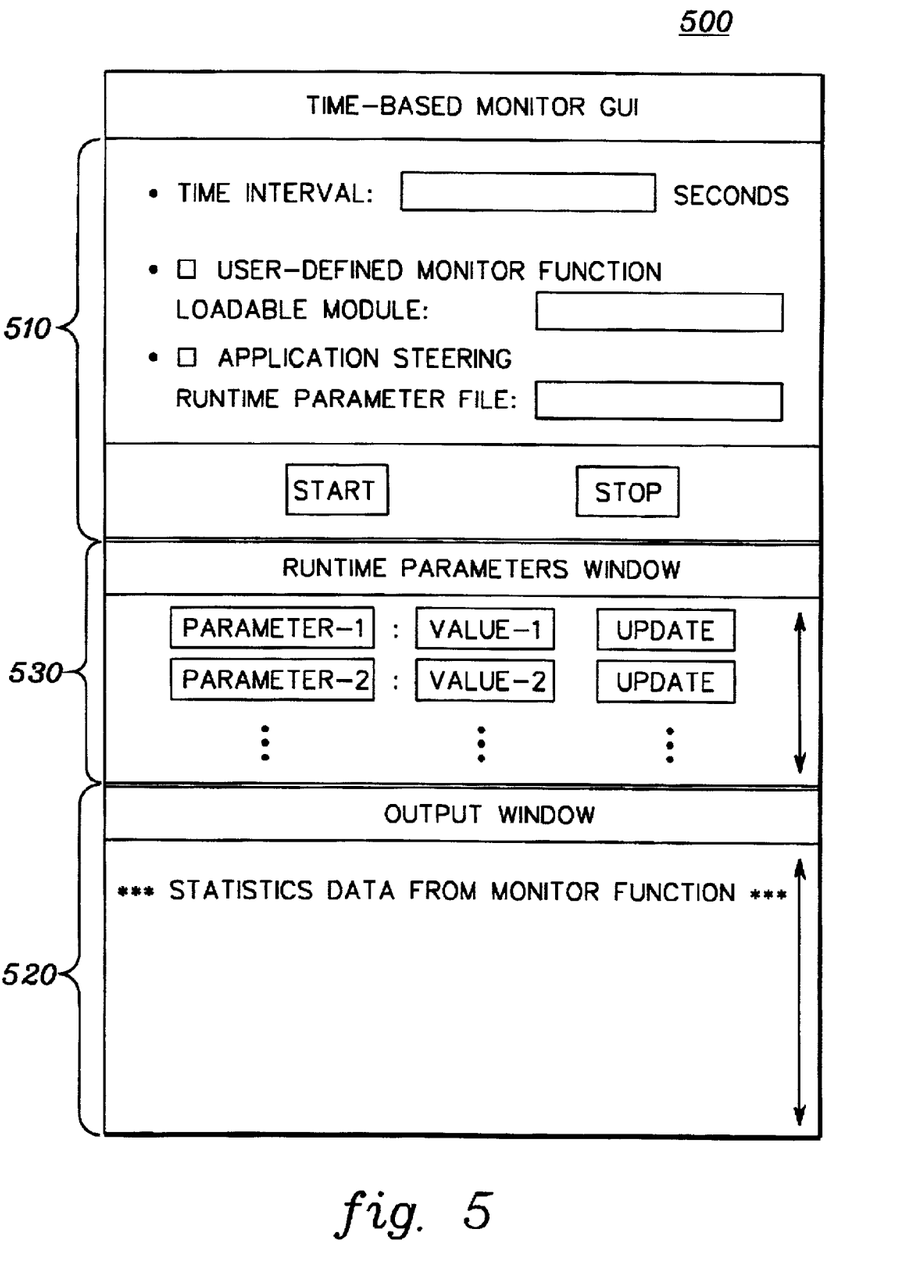
FIG. 5 is an alternate embodiment of a graphical user interface of a time-interval based monitor function in accordance with another aspect of the present invention.

Note that the global variable gparm_1's value can be changed by using a monitor tool's runtime parameters window (see FIG. 5). When the gparm_1 is changed, the behavior of function appl_func_2 will change accordingly.

target application:

```
global_variable gval_1;
global_variable gval_2;
global_variable gval_3;
global_variable gparm_1;
main( ) {
    ...
}
appl_func_1( ) {
    ...
}
appl_func_2( ) {
    ...
    // use gparm_1 to decide runtime operation,
    // e.g., I/O buffer size.
}
...
loadable module:
    extern gval_1;
    extern gval_2;
    extern gval_3;
    extern appl_func_1( );
dmonitor(void* Ais_send) {
    ...
    Ais_send(gval_1);
    Ais_send(gval_2);
    Ais_send(gval_3);
    ...
    if (gval_1 > threshold_1) {
        appl_func_1( );
    }
    ...
}
```

For example, if an application is designed to be monitoring-aware, i.e., it is designed in anticipation of working with certain monitor functions, global data structures can be employed in the application to store interesting information, and special functions can be deployed in the application that will be invoked when a certain global data structure's value changes. When a corresponding monitor function is loaded into such an application, the monitor function can examine the target application's global data structures, and either report the value(s) back to the tool's output window, or alter one or more of the global data structure's value(s) and let the value change triggers the execution of the special functions, which basically provides a user with the power to dynamically steer an application's run-time behavior.

(8) the tool can be used with any production application, it does not require any special pre-processing of the application, or special compilation options.

In general, three sets of DPCL functions can be employed to implement an embodiment of this invention; namely, the DPCL connect functions, DPCL disconnect functions, and DPCL phase functions. The first two are used to dynamically connect to and disconnect from a running application. The third function set is used to set the monitor function and monitor time interval in a connected application, as well as the suspend/resuming of monitoring operations.

In order to support application steering in a monitor operation, a fourth set of DPCL functions can also be employed. This fourth set comprises a DPCL one time probe. The one time probe is, for instance, a piece of executable code block which is loaded into a connected application's address space. The probe is executed once and only once, as its name implies. The one-time probe is used to update a global variable in a target application. A list of updatable global variables is provided by a user, and references to the variables are kept in the monitor tool. When a user wants to update the value of a specified global variable, the monitor tool will construct a DPCL expression that contains a reference to the target variable and its new value. The expression is supplied to the DPCL execute function, which carries out the update operation in the target application's address space.

One skilled in the art should note that the DPCL functions themselves exist in the art and are described in the above-referenced and incorporated publication. These functions are employed in order to implement the monitoring processed described herein.

As noted above, application steering is facilitated in accordance with one aspect of the present invention. In a monitor-aware application, the application is developed to anticipate that at run-time its behavior will be observed in certain ways, and some of its variable values may be changed on-the-fly in ways that will alter its execution behavior. For a further explanation, reference the above discussion.

To achieve this goal, a set of data is kept in an area where a monitor function can access the data. In one case, the data is kept in the application's global variables, i.e., those variables that are visible/accessible to any part of the application. The global data can be further divided into two groups: statistics data and run-time parameters. The statistics data is used to record the application's run-time behavior, and is updated constantly to reflect the application's current situation. This comprises information that will be useful for a corresponding monitor function to understand the run-time performance/behavior of the application. The run-time parameters are values that the application uses to determine its certain operation, for example, I/O buffer size, the number of run-time thread creations, etc. The run-time parameters should have default values that the application uses in normal execution.

The concept behind application steering is to observe the information stored in the application's statistics data on-the-fly, which will provide insight into the application's run-time behavior. If it is desired to alter one or more of the run-time parameters to steer the application into a different execution mode (e.g., change to use a larger I/O buffer, or reduce a number of run-time thread creations), the monitor can be employed to carry out the value changing operation.

In order to achieve an application steering capability, the interface of FIG. 3 can be updated as shown in FIG. 5. In FIG. 5, the graphical user interface 500 includes a user input window 510, as well as a data output window 520. In this interface, a new option is added, i.e., application steering. When this option is selected, a user also enters the name of a file that contains a list of run-time parameters, one parameter per line. The name of the parameters needs to match the names used in the target application, with any mismatched names being discarded. When a run-time parameter file is specified (along with the time interval and monitor function designed to retrieve the target application's statistics data having correspondence to the run-time parameters) and the start button is pressed, a panel 530 will be presented (shown between the time-based monitor panel 510 at the top, and the output window panel 520 at the bottom). The new panel, labeled run-time parameters window, presents a list of run-time parameters (as those specified in the input run-time parameter file), and their current value. Each parameter has an "update" button to its right. The name of the run-time parameters cannot be changed, but the values associated with them can. When a user wants to change one of the run-time parameters values, the user clicks on the parameter's value field, overwrites it with a new value, then hits the update button. The monitor tool will use the DPCL one time probe to match the run-time parameter to the connected application, and update its value with the newly specified value. Based on how the specified run-time parameter is used in the target application, the new value can then alter the behavior of the functions (in the application) that use this parameter.

In order to correlate the application's statistics data and run-time parameters, the monitor function is designed in a way that will report the statistics data back to the monitor tool (in the output window) so as to allow the user to make a decision on which run-time parameter(s) should be changed, and by how much, so that the changes will be most beneficial to the target application's run-time performance or to carry out a particular process. When a monitor function retrieves the statistics data from a connected application, it can either report the retrieved data back to the output window (in the monitor tool) directly, or the monitor function could carry out some defined calculation or data manipulation such that the data reported back to the tool can be more readily interpreted.

The following is a further example of how a set of global variables in a target application can be employed for application steering. Three global variables are defined: (1) io_times which keeps track of the number of I/O operations; (2) buffer_size which is used by an I/O function to decide the size of an I/O buffer; and (3) mem_use which records the total amount of memory used by an application. A function io_action in the application uses the buffer_size to allocate buffers for I/O operation and record the number of I/O operations in the variable io_times and memory usage in mem_use.

In general, a bigger I/O buffer will reduce the number of I/O operations, but a bigger buffer will also use up more memory resources.

A monitor function that retrieves the io_times and mem_use values periodically can provide a user the runtime I/O behavior of the application. If the user decides to increase the I/O buffer size, the runtime parameters window in the monitor tool can be used to provide a new value for variable buffer_size, the new value will in turn be used by the preceding call to function io_action, which in turn will change the application's runtime I/O behavior, and the effect of the new value will be reflected in variables io_times and mem_use, which will again be retrieved by the monitor function and displayed on the monitor tool's output window. A user can repeat the process until an ideal I/O buffer size is found.

Figure 6A:
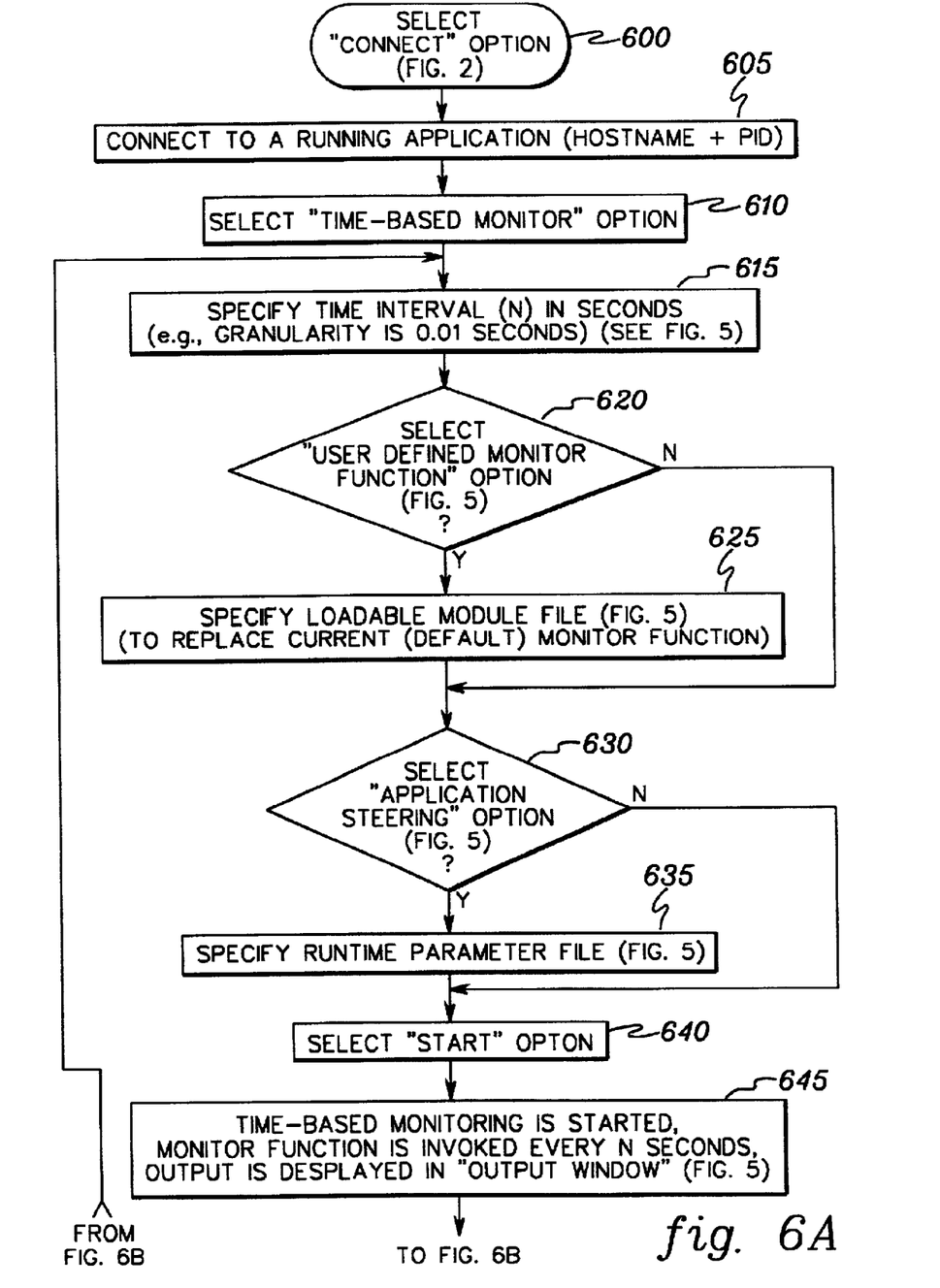
FIGS. 6A & 6B are a flowchart of one embodiment of a monitor function in accordance with an aspect of the present invention, which allows application steering through monitoring and modification of one or more global variables of the application being monitored.
Figure 6B:
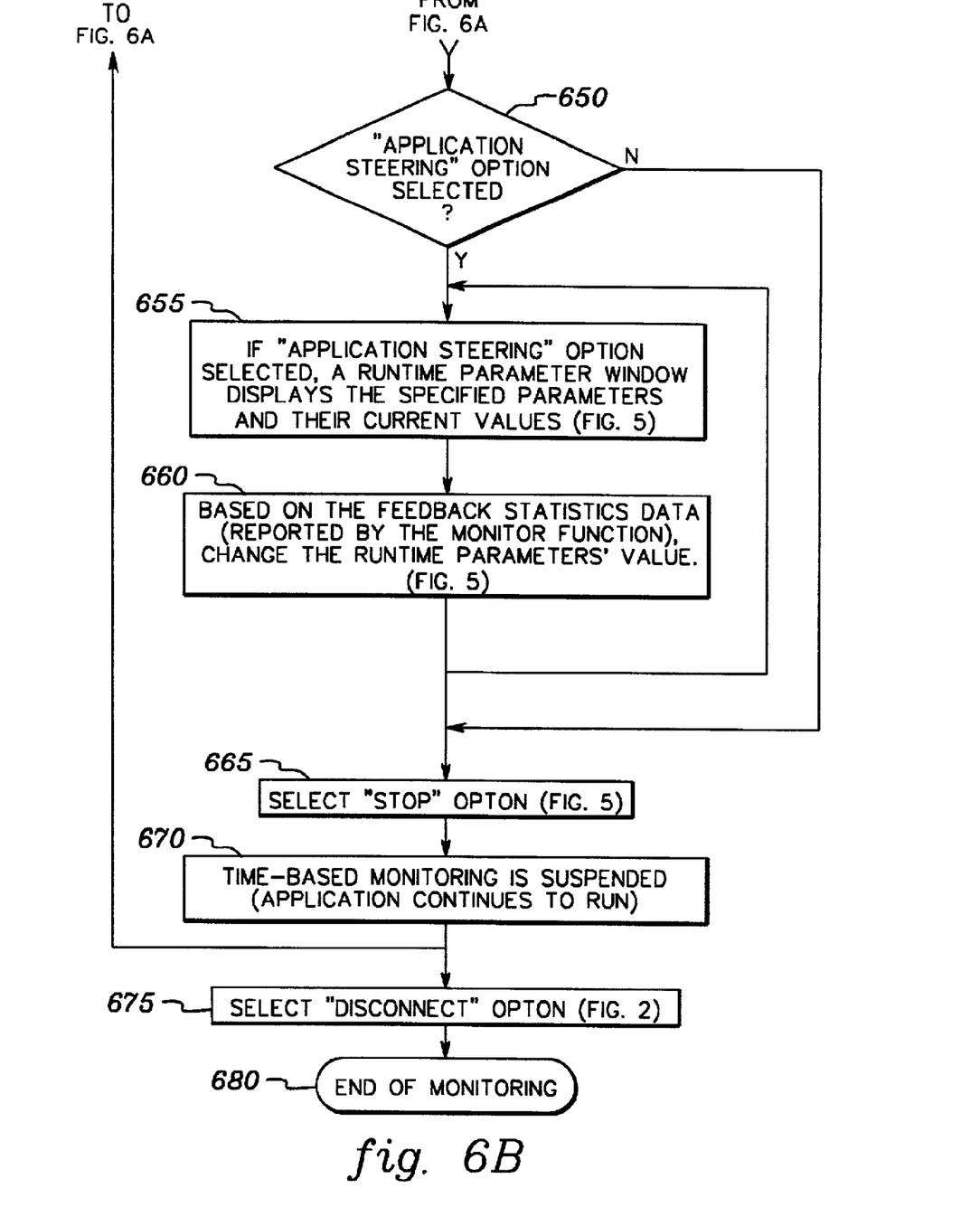

FIGS. 6A & 6B depict one flowchart embodiment of monitoring processing employing application steering as described above.

Processing again begins by a user selecting the "connect" option shown in FIG. 2 600. Connection is established by the user providing a machine host name and a target application PID to connect to a running target application 605. The user then selects the "time-based monitor" option depicted in FIG. 2 610, which allows the user to initially specify the monitor time interval 615 and whether to use a "user-defined monitor function" or a default monitor function. If a custom or user-defined monitor function is to be employed, then the "user-defined monitor function" option is selected 620, and the user specifies a loadable module file to replace the current monitor function 625.

The user next decides whether to select the "application steering" option shown in FIG. 5. If so, then the user specifies a run-time parameter file containing values to be monitored 635. Again, this option assumes that the application is initially set up to allow for monitoring and modification of its global variables as described herein. The user then selects the "start" option shown in FIG. 5 640 which begins the time-based monitoring. The monitor function is invoked every N seconds, and outputs the desired statistics data in the output window 520 of FIG. 5 645. If a user has selected the "application steering" option 650, a run-time parameter window is created to display the specified parameters and their current values 655. Based on the feedback statistics data (reported by the monitor function), the user may change the value of one or more run-time parameters 660. Processing stays in this loop until the desired application steering has been completed.

Upon completion of monitoring, the user selects the "stop" option 665, which suspends the time-based monitoring, while allowing execution of the application to continue 670. If desired, the monitor time interval can then be modified and/or a new monitor function can be specified. If the monitoring function is complete, then the user selects the "disconnect" option of FIG. 2 675, which ends the monitoring process 680.

The following is a sample implementation of various functions employed by a time-interval based monitor tool that uses DPCL as the fundamental building block. This sample uses simplified DPCL syntax to demonstrate the implementation concept.

pid=target application's process id.
hostname=name of the machine where the target application is running.
time_interval=the time interval at which the monitor function will be invoked.
monitor_func_name=monitor function.
load_module=the loadable module that contains the monitor function.
global_param=a global variable in the target application.
To connect to a running application:
    process=new Process(hostname, pid);
    process.connect( );
To load a loadable module into the target application:
    module=new ProbeModule(load_module);
    process.load_module(module);
To locate the monitor function within the loadable module:
    monitorFunc=module.get_reference(monitor_func_name);
To setup the time-interval based monitor function in the target application:
    phase=new Phase(time_interval, monitorFunc);
    process.add_phase(phase);
To re-set time interval:
    process.set_phase_interval(phase, new_time_interval);
To change the value of a target application's global variable:
    probeExp=new ProbeExp(global_param, new_value);
    process.execute(probeExp); and
To disconnect from the target application:
    process.disconnect( ).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer application monitoring method comprising:
providing a time-interval based monitor function in executable form, wherein the time-interval based monitor function is invoked at a monitor time interval; and
inserting the time-interval based monitor function into an application to be monitored.

2. The method of claim 1, wherein the application comprises a running application, and wherein said inserting comprises dynamically inserting the time-based monitor function into the running application.

3. The method of claim 2, wherein said inserting comprises inserting the time-based monitor function into an address space of the running application.

4. The method of claim 1, wherein said inserting comprises inserting the time-based monitor function into an address space of the application transparent to the application and without requiring recompilation of the application.

5. The method of claim 1, further comprising accessing through the time-based monitor function a global variable of the application.

6. The method of claim 5, wherein the accessing further comprises modifying the global variable of the application through the time-based monitor function, thereby effecting a change in the application's operation.

7. The method of claim 6, wherein the application comprises a running application and wherein the modifying comprises dynamically monitoring and modifying the global variable of the running application through the time-based monitor function.

8. The method of claim 1, wherein the application comprises one application of a plurality of applications running in a computing environment.

9. The method of claim 1, wherein the method further comprises allowing modification of the monitor time interval after the time-based monitor function has been inserted into the application.

10. The method of claim 1, wherein the time-based monitor function comprises a computer executable, and wherein the time-based monitor function executes at the monitor time interval and provides an indication of the performance of the application.

11. The method of claim 1, wherein the providing comprises providing a default time-based monitor function, and allowing a user to define a custom time-based monitor function, and wherein the inserting comprises inserting at least one of the default time-based monitor function or the custom time-based monitor function into the application.

12. The method of claim 1, wherein the application comprises a running application and wherein the inserting comprises dynamically inserting the time-based monitor function into the running application, and wherein the method further comprises dynamically removing the time-based monitor function from the running application after monitoring thereof, wherein the inserting and the removing of the time-based monitor function are transparent to the running application.

13. The method of claim 1, wherein the application comprises one application of a plurality of applications, and wherein the inserting comprises inserting the time-based monitor function into at least some applications of the plurality of applications, wherein the method comprises simultaneously monitoring performance of the at least some applications of the plurality of applications.

14. A system for monitoring a computer application, the system comprising:
means for providing a time-interval based monitor function in executable form, wherein the time-interval based monitor function is invoked at a monitor time interval; and
means for inserting the time-interval based monitor function into an application to be monitored.

15. The system of claim 14, wherein the application comprises a running application, and wherein said means for inserting comprises means for dynamically inserting the time-based monitor function into the running application.

16. The system of claim 15, wherein said means for inserting comprises means for inserting the time-based monitor function into an address space of the running application.

17. The system of claim 14, wherein said means for inserting comprises means for inserting the time-based monitor function into an address space of the application transparent to the application and without requiring recompilation of the application.

18. The system of claim 14, further comprising means for accessing through the time-based monitor function a global variable of the application.

19. The system of claim 18, wherein the means for accessing further comprises means for modifying the global variable of the application through the time-based monitor function, thereby effecting a change in the application's operation.

20. The system of claim 19, wherein the application comprises a running application and wherein the means for modifying comprises means for dynamically monitoring and modifying the global variable of the running application through the time-based monitor function.

21. The system of claim 14, wherein the application comprises one application of a plurality of applications running in a computing environment.

22. The system of claim 14, wherein the system further comprises means for allowing modification of the monitor time interval after the time-based monitor function has been inserted into the application.

23. The system of claim 14, wherein the time-based monitor function comprises a computer executable, and wherein the time-based monitor function executes at the monitor time interval and provides an indication of the performance of the application.

24. The system of claim 14, wherein the means for providing comprises means for providing a default time-based monitor function, and for allowing a user to define a custom time-based monitor function, and wherein the means for inserting comprises means for inserting at least one of the default time-based monitor function or the custom time-based monitor function into the application.

25. The system of claim 14, wherein the application comprises a running application and wherein the means for inserting comprises means for dynamically inserting the time-based monitor function into the running application, and wherein the system further comprises means for dynamically removing the time-based monitor function from the running application after monitoring thereof, wherein the means for inserting and the means for removing of the time-based monitor function are transparent to the running application.

26. The system of claim 14, wherein the application comprises one application of a plurality of applications, and wherein the means for inserting comprises means for inserting the time-based monitor function into at least some applications of the plurality of applications, wherein the system comprises means for simultaneously monitoring performance of the at least some applications of the plurality of applications.

27. A system for monitoring a computer application, the system comprising:
   a first computing unit containing a time-interval based monitor function in executable form, wherein the time-interval based monitor function is invoked at a monitor interval; and
   a second computing unit to insert the time-interval based monitor function into an application to be monitored.

28. The system of claim 27, wherein the first computing unit and the second computing unit comprise a same computing unit.

29. At least one program storage device readable by a machine, tangibly embodying at least one program of instructions executable by the machine to perform a method of monitoring a computer application, the method comprising:
   proving a time-interval based monitor function in executable form, wherein the time-interval based monitor function is invoked at a monitor time interval; and
   inserting the time-interval based monitor function into an application to be monitored.

30. The at least one program storage device of claim 29, wherein the application comprises a running application, and wherein said inserting comprises dynamically inserting the time-based monitor function into the running application.

31. The at least one program storage device of claim 30, wherein said inserting comprises inserting the time-based monitor function into an address space of the running application.

32. The at least one program storage device of claim 29, wherein said inserting comprises inserting the time-based monitor function into an address space of the application transparent to the application and without requiring recompilation of the application.

33. The at least one program storage device of claim 29, further comprising accessing through the time-based monitor function a global variable of the application.

34. The at least one program storage device of claim 33, wherein the accessing further comprises modifying the global variable of the application through the time-based monitor function, thereby effecting a change in the application's operation.

35. The at least one program storage device of claim 34, wherein the application comprises a running application and wherein the modifying comprises dynamically monitoring and modifying the global variable of the running application through the time-based monitor function.

36. The at least one program storage device of claim 29, wherein the application comprises one application of a plurality of applications running in a computing environment.

37. The at least one program storage device of claim 29, wherein the method further comprises allowing modification of the monitor time interval after the time-based monitor function has been inserted into the application.

38. The at least one program storage device of claim 29, wherein the time-based monitor function comprises a computer executable, and wherein the time-based monitor function executes at the monitor time interval and provides an indication of the performance of the application.

39. The at least one program storage device of claim 29, wherein the providing comprises providing a default time-based monitor function, and allowing a user to define a custom time-based monitor function, and wherein the inserting comprises inserting at least one of the default time-based monitor function or the custom time-based monitor function into the application.

40. The at least one program storage device of claim 29, wherein the application comprises a running application and wherein the inserting comprises dynamically inserting the time-based monitor function into the running application, and wherein the method further comprises dynamically removing the time-based monitor function from the running application after monitoring thereof, wherein the inserting and the removing of the time-based monitor function are transparent to the running application.

41. The at least one program storage device of claim 29, wherein the application comprises one application of a plurality of applications, and wherein the inserting comprises inserting the time-based monitor function into at least some applications of the plurality of applications, wherein the method comprises simultaneously monitoring performance of the at least some applications of the plurality of applications.

* * * * *